United States Patent
Schneider et al.

(10) Patent No.: US 6,959,937 B2
(45) Date of Patent: Nov. 1, 2005

(54) RUNNING BOARD MOUNTING BRACKET

(75) Inventors: Steven E. Schneider, Commerce Township, MI (US); Michael A. Quesenberry, West Bloomfield, MI (US); Thomas M. Pilette, Lake Orion, MI (US); Leszek T. Derbis, Ortonville, MI (US); Bruce E. McDougall, Grandblank, MI (US)

(73) Assignee: Decoma International Inc., Concord (CA)

( * ) Notice: Subject to any disclaimer, the term of this patent is extended or adjusted under 35 U.S.C. 154(b) by 120 days.

(21) Appl. No.: 10/468,428

(22) PCT Filed: Feb. 20, 2002

(86) PCT No.: PCT/CA02/00203

§ 371 (c)(1),
(2), (4) Date: Aug. 19, 2003

(87) PCT Pub. No.: WO02/066292

PCT Pub. Date: Aug. 29, 2002

(65) Prior Publication Data

US 2004/0070163 A1    Apr. 15, 2004

Related U.S. Application Data

(60) Provisional application No. 60/269,332, filed on Feb. 20, 2001.

(51) Int. Cl.$^7$ ................................. B60R 3/00
(52) U.S. Cl. .................. 280/163; 280/164.1; 248/300; 248/301; 182/92
(58) Field of Search ............................... 248/200, 300, 248/301; 182/92, 120; 280/163, 164.1, 164.2, 280/166; 296/75, 199

(56) References Cited

U.S. PATENT DOCUMENTS

| 640,883 | A | * | 1/1900 | Dhuse | 296/75 |
| 1,298,300 | A | * | 3/1919 | Daniels | 280/164.2 |
| 2,202,412 | A | * | 5/1940 | York | 248/255 |
| 3,758,134 | A | * | 9/1973 | Stewart | 280/163 |
| 4,013,253 | A | * | 3/1977 | Perrault et al. | 248/222.51 |
| 4,382,416 | A | * | 5/1983 | Kellogg-Smith | 114/90 |
| 4,405,141 | A | * | 9/1983 | Jurek | 280/163 |
| 5,022,679 | A | * | 6/1991 | Pazik | 280/833 |
| 5,511,750 | A | * | 4/1996 | Evenson | 248/200 |
| 5,895,064 | A | * | 4/1999 | Laubach | 280/163 |
| 5,944,293 | A | * | 8/1999 | Loy | 248/220.21 |
| 6,050,579 | A | * | 4/2000 | Selland et al. | 280/163 |
| 6,412,799 | B1 | * | 7/2002 | Schrempf | 280/163 |
| 6,612,596 | B2 | * | 9/2003 | Jeon et al. | 280/166 |

FOREIGN PATENT DOCUMENTS

| EP | 10278679 | 10/1998 |
| JP | 09071186 | 3/1997 |

* cited by examiner

Primary Examiner—Christopher P. Ellis
Assistant Examiner—Kelly E. Campbell
(74) Attorney, Agent, or Firm—Clark Hill PLC

(57) ABSTRACT

A running board support assembly (200) for fastening a running board step (104) to a vehicle includes a support bracket (204) for engagement with the running board step, and a mounting bracket (202) for coupling the support bracket (204) to the vehicle. The mounting bracket (202) includes a hooking end (212) and a pin (214). The support bracket (204) includes a hook (226) for engagement with the hooking end (212), and an aperture (218) for engagement with the pin (214). When assembled, the hook (226) and the aperture (218) cooperate to tension the mounting bracket (202) and thereby secure the support bracket (204) to the mounting bracket (202).

4 Claims, 2 Drawing Sheets

US 6,959,937 B2

RUNNING BOARD MOUNTING BRACKET

This application is a 371 filing of PCT Application CA02/00203, filed Feb. 20, 2002, which claims priority to and all the benefits of U.S. Provisional Patent Application No. 60/269,332, filed on Feb. 20, 2001.

FIELD OF THE INVENTION

The present invention relates to an automotive running board. In particular, the present invention relates to a support assembly for attaching a running board to a vehicle.

BACKGROUND OF THE INVENTION

The conventional automotive running board consist of a step and a support frame which secures the step to the vehicle. Typically, the support frame is bolted to the undercarriage of the vehicle and extends laterally outwards from the undercarriage in order to locate the step adjacent the door sill or the rocker panel of the vehicle. Although running boards are widely used, particularly in trucking applications, the conventional running board has at least two notable deficiencies.

First, since the support frame of the conventional running board is secured to the undercarriage of the vehicle, it is often difficult to access the attachment points of the running board.

Second, the support frame of the conventional running board is secured to the undercarriage through bolts. These bolts are stressed whenever a load is placed on the running board step, and must be periodically retorqued, otherwise the step of the running board may begin to rattle when the vehicle is in motion. However, bolt retorquing is often problematic since the bolts are subject to corrosion, and since access to the bolts is difficult.

Therefore, there remains a need for a running board which can be easily attached to a vehicle. Further, there remains a need for a running board which is not in need of periodic adjustment to maintain the running board step rigidly secured to the vehicle.

SUMMARY OF THE INVENTION

The disadvantages of the prior art may be overcome by providing a running board support assembly that operates to tension the connection between the support bracket and the mounting bracket.

According to one aspect of the present invention, there is provided a running board support assembly that secures a running board step to a vehicle. The support assembly includes a support bracket engagable with the running board step in a supporting relation. The support bracket has a hook at a distal end and an aperture spaced from the distal end. A mounting bracket couples with the support bracket. The mounting bracket has a generally U-shaped configuration having a bight portion and a first arm and a second arm, each of the arms extend from the bight portion. The first arm has a hooking end engaging the hook in a pivoting relation and the second arm has a pin engaging the aperture upon urging the first arm towards the second arm to align the pin with the aperture. When assembled, the hook and the hooking end cooperate to tension the mounting bracket and thereby lock the support bracket to the mounting bracket.

According to another aspect of the present invention, there is provided a running board kit for securing a running board step to a vehicle.

According to yet another aspect of the present invention, there is provided a method of installing a running board step to a vehicle. A running board step is provided with a pair of support brackets. Each support bracket has a hook at a distal end and an aperture spaced from the distal end. A pair of mounting brackets is mounted on the vehicle. Each mounting bracket has a generally U-shaped configuration having a bight portion and a first arm and a second arm extending from the bight portion. The first arm has a hooking end and the second arm has a pin. The hooks of the support bracket are hooked about respective hooking ends of the mounting bracket. The support bracket are pivoted about the hooks and urging the first arm towards the second arm aligning the pin with the aperture. The pin is inserted into the aperture. The pin is fastened to the mounting bracket.

BRIEF DESCRIPTION OF THE DRAWINGS

The preferred embodiment of the invention will now be described, by way of example only, with reference to the attached drawings, in which.

DETAILED DESCRIPTION OF THE PREFERRED EMBODIMENT

Figure 1:
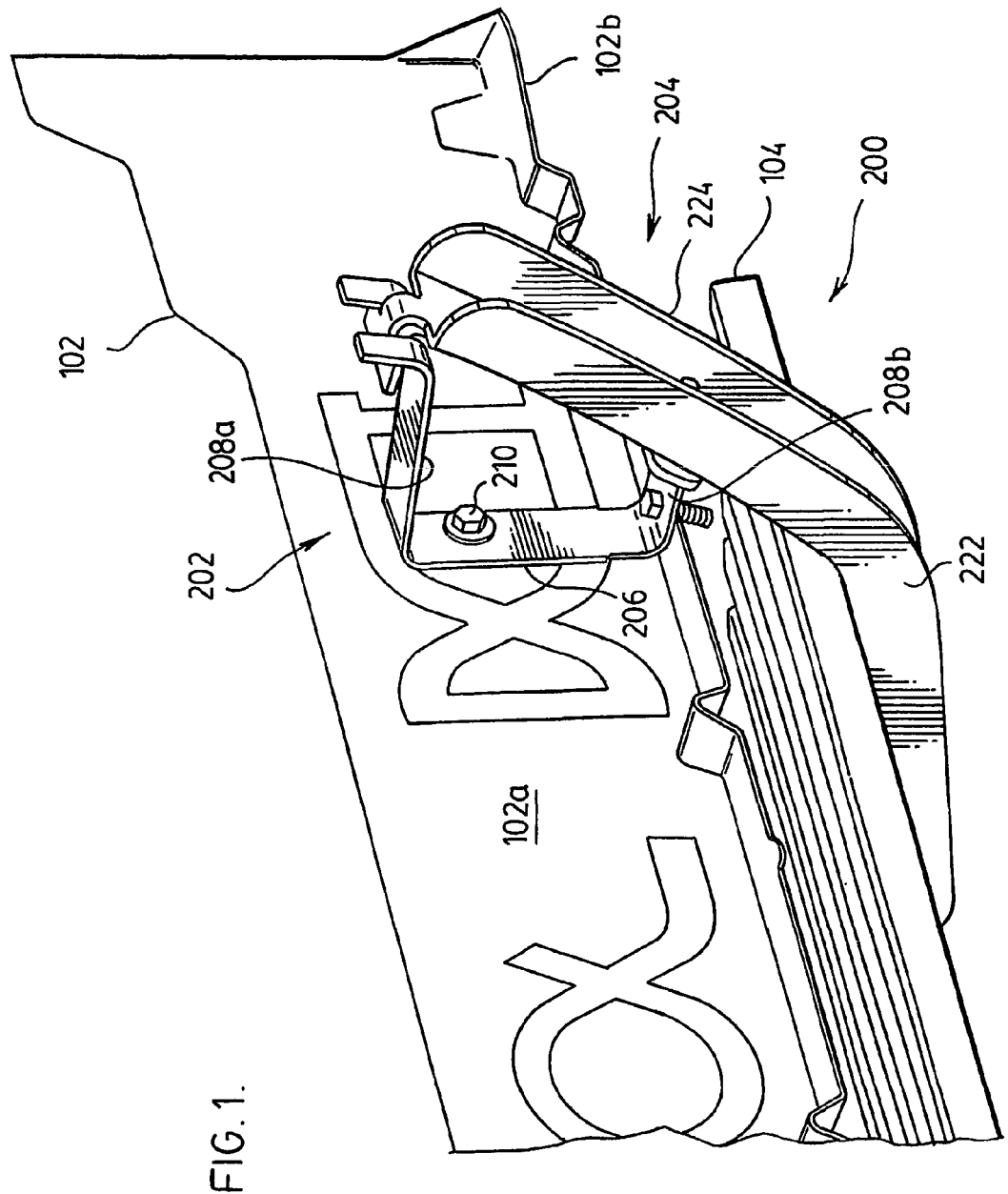
FIG. 1 is a perspective view of the door sill panel of a vehicle, the running board step, and the mounting bracket and the support bracket of the running board assembly securing the running board step to the door sill panel.

FIG. 1 of the drawings shows an inner portion of the door sill 102 of a vehicle, a running board step 104, and a running board support assembly 200 for securing the running board step 104 to the door sill 102. Typically, the door sill 102 is located adjacent the bottom portion of a vehicle door, and includes an outer panel (not shown), a substantially vertical inner panel 102a secured to the outer panel, and a substantially horizontal apron 102b which extends inwardly from the lower extremity of the vertical inner panel 102a towards the vehicle undercarriage.

As shown, the running board assembly 200 comprises a mounting bracket 202 and a support bracket 204. Preferably, the mounting bracket 202 is flexible and is fabricated from a metal alloy, however other suitable materials may be used as will be apparent to those of ordinary skill. Also, preferably the mounting bracket 202 has a substantially U-shape, and comprises a substantially planar bight 206 and a pair of parallel opposing arms 208a, 208b which extend at a substantially right angle from the bight 206. However, as will become apparent, other shapes for the mounting bracket 202 may also be adopted.

Figure 2:
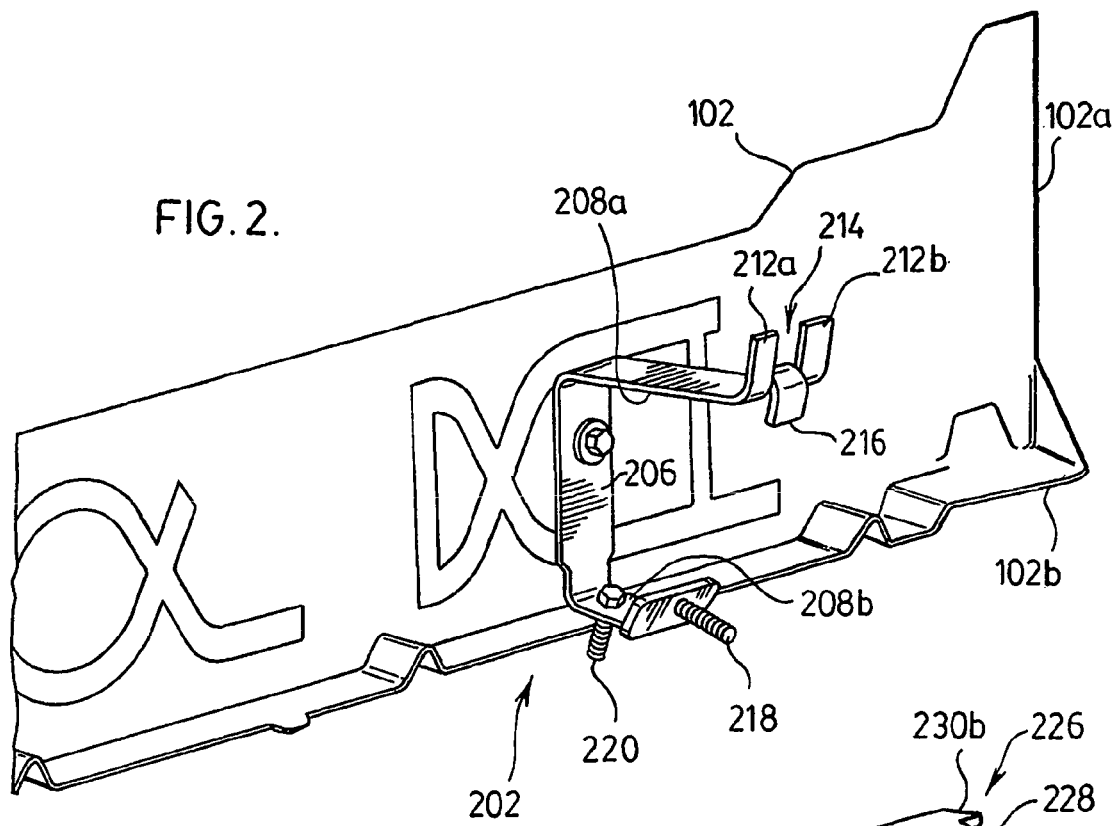
FIG. 2 is a perspective view of the mounting bracket and the door sill panel shown in FIG. 1.

The bight 206 includes an aperture (concealed in the drawings) which receives a retaining bolt 210 therein for securing the mounting bracket 202 to the vertical inner panel 102a of the door sill 102. As shown in FIGS. 1 and 2, when the mounting bracket 202 is secured to the door sill 102, the bight 206 of the mounting bracket 202 is disposed with a substantially vertical orientation, flush against the vertical inner panel 102a of the door sill 102. The arms 208 extend laterally inboard from the vertical inner panel 102a with a substantially horizontal orientation beneath the undercarriage of the vehicle, with one of the arms 208 being disposed above the other of the arms 208.

Each of the arms 208 includes a fastening portion disposed adjacent a respective end thereof. Preferably, the upper arm 208a is provided with a hooking end or a hook receiving structure that includes a pair of separated upturned fingers 212a, 212b defining a locking channel 214 therebetween. The upper arm 208a also includes a downturned stop 216 which is disposed centrally to the upturned fingers 212. As will become apparent, other configurations for the hooking end may also be adopted.

Preferably, the fastening portion provided on the lower arm 208b includes a tensioning pin 218 extending at an acute angle therefrom in a direction laterally away from the bight 206 and downwardly away from the upper arm 208a. Preferably, the lower arm 208b also includes a guide pin 220 extending therefrom in a direction laterally towards the bight 206 but downwardly away from the upper arm 208a for securing the lower arm 208b to the horizontal apron 102b of the door sill 102. Further, preferably the tensioning pin 218 and the guide pin 220 are threaded to receive a nut thereon to rigidly secure the mounting bracket 202 (and hence the running board step 104) to the door sill 102. As above, however, other configurations for the lower fastening portion may also be adopted.

Figure 3:
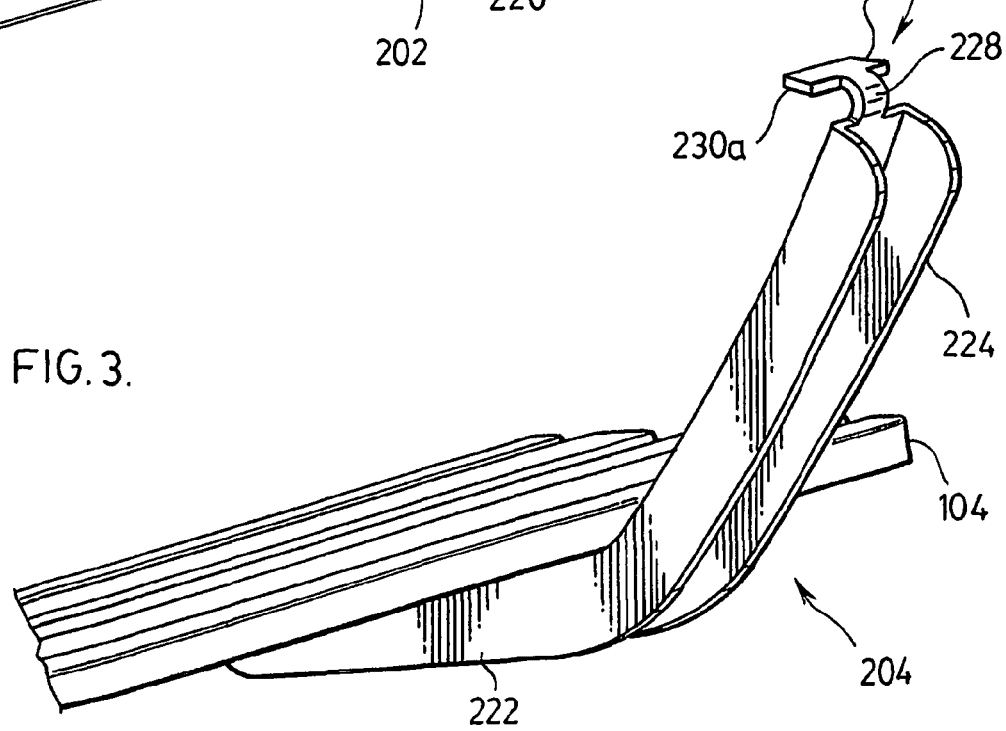
FIG. 3 is a perspective view of the running board step and the support bracket shown in FIG. 1.

The support bracket 204 has a substantially L-shape, and comprises a base 222 and a leg 224 extending upwardly from the base 222. Preferably, the support bracket 204 has an inverted U-shaped cross-section. As shown in FIGS. 1 and 3, when the support bracket 204 is secured to the vehicle, the leg 224 is disposed beneath the undercarriage of the vehicle. Preferably, the leg 224 extends at an obtuse angle away from the base 222, however other orientations may be adopted.

The leg 224 includes a hook 226 disposed at a distal end thereof. As shown in FIG. 3, the hook 226 includes a curved portion 228 extending from the end of the leg 224, and a substantially planar locking flange 230 disposed at the end of the curved portion 228. Preferably, the locking flange 230 comprises a pair of horizontal locking tabs 230a, 230b which extend laterally away from each other. As shown in FIG. 1, the curved portion 228 of the hook 226 is sized to be slidably received within the locking channel 214 of the mounting bracket 202 and is shaped to urge the tabs 230a, 230b rigidly against the upturned fingers 212a, 212b of the mounting bracket 202 when the downturned stop 216 engages the leg 224. As will be apparent, if configurations for the upper fastening portion (other than that shown in the drawings) are adopted, it may be necessary to reconfigure the hook 226 to ensure that the leg 224 securely engages the mounting bracket 202.

The leg 224 of the support bracket 204 also includes an aperture spaced from the distal end for receiving the tensioning pin 218 therein. However, the aperture is located within the leg 224 such that when the hook 226 is rigidly engaged by the fastening portion of the upper arm 208a, the aperture does not readily engage with the tensioning pin 218. Rather, to locate the tensioning pin 218 within the aperture, the upper arm 208a must be urged downwards or cantilevered towards the lower arm 208b. In this position, the upper and lower arms 208 are no longer parallel, and the mounting bracket 202 is maintained under tension, thereby locking the support bracket 204 to the mounting bracket 202.

To secure the running board step 104 to the vehicle, initially the bight 206 of the mounting bracket 202 is secured to the inner vertical surface 102a of the door sill 102 (or frame of the vehicle) and the guide pin 220 of the mounting bracket 202 is secured to the horizontal apron 102b of the door sill 102. Preferably, the mounting bracket 202 is secured to the door sill 102 by nuts or other suitable fasteners, as part of the original equipment manufacturing process.

Thereafter, the running board step 104 is secured to the base 222 of the support bracket 204 by suitable fasteners. The running board step/support bracket assembly is oriented such that the leg 224 extends under the vehicle, and is then secured to the vehicle by hooking the curved portion 228 at the distal end of leg 224 within the locking channel 214 of the fastening portion of the upper arm 208a. The board step/support bracket assembly is then rotated downwards and laterally outboard away from the undercarriage of the vehicle. The locking flange 230 of the anchor 226 will rotate against the bias of upturned fingers 212 of the fastening portion until the leg 224 engages the downturned stop 216 of the upper arm 208a.

After the leg 224 engages the downturned stop 216, the board step/support bracket assembly is rotated further away from the undercarriage and pivoting about the end of the stop 216, thereby urging the upper arm 208a downwards towards the lower arm 208b and placing the mounting bracket 202 under tension. The board step/support bracket assembly is rotated downwards and outwards until the tensioning pin 218 of the lower arm 208b can be located within the aperture provided in the leg 224 of the support bracket 204. As will be apparent, once the tensioning pin 218 is captured within the aperture provided in the leg 224, the tension due to the deformation of the upper arm 208a relative to the lower arm 208b locks the support bracket 204 to the mounting bracket 202. To reduce the likelihood of the support arm 204 being subsequently dislodged from the mounting bracket 202 by means of a load being placed on the running board step 104, preferably the support arm 204 is further secured to the mounting bracket 202 by means of a suitable fastener applied to the tensioning pin 218.

As will be apparent from the foregoing, since the support bracket 204 and the attached running board step 104 are secured to the vehicle due to the tension induced in the mounting bracket 202, the running board step 104 is not prone to rattle. Further, since the installer need only engage the locking flange 230 of the anchor 226 between the upturned fingers 212 of the upper arm 208a, the installer can secure the running board step 104 to the vehicle without the need for a hoist.

The present invention is defined by the claims appended hereto, with the foregoing description being merely illustrative of the preferred embodiment of the present invention. Those of ordinary skill may envisage certain additions, deletions and/or modifications to the described embodiments which, although not explicitly described herein, do not depart from the scope of the invention as defined by the appended claims.

What is claimed is:

1. A running board support assembly for securing a running board step to a vehicle, the support assembly comprising:

a support bracket engagable with the running board step in a supporting relation, said support bracket having a hook end at a distal end and an aperture spaced from said distal end;

a mounting bracket for coupling with the support bracket, the mounting bracket having a generally U-shaped configuration having a bight portion and a first arm and a second arm, each of said arms extending from the bight portion, said first arm having a hooking end engaging said hook in a pivoting relation and a second of said arms having a pin engaging said aperture upon urging said first arm towards said second arm to align said pin with said aperture, said mounting bracket having an aperture sized to receive a fastener to attach the mounting bracket to the vehicle and a guide pin extending therefrom, said guide pin positioned to engage a generally horizontal flange of a mounting structure of the vehicle thereby maintaining generally vertical alignment of said mounting bracket relative to the vehicle;

said hooking end comprising a pair of locking fingers defining a locking channel therebetween, and said hook comprising a locking flange configured to engage said fingers, the hooking end further comprising a stop for urging the locking flange against the locking fingers when the support bracket engage said stop; and a fastener connectable to said pin for fastening said support bracket to said mounting bracket.

2. The running board support assembly according to claim 1, further comprising a fastener connectable to said guide pin.

3. A method of installing a running board step to a vehicle, comprising the steps of:

providing a running board step with a pair of support brackets, each having a hook at a distal end and an aperture spaced from said distal end;

mounting a pair of mounting brackets on the vehicle, each of said mounting brackets having a generally U-shaped configuration having a bight portion and a first arm and a second arm extending from the bight portion, said first arm having a hooking end and said second arm having a pin;

hooking said hooks of said support bracket about respective hooking ends of said mounting bracket;

pivoting said support bracket about said hooks and urging said first arm towards said second arm aligning said pin with said aperture;

inserting said pin into said aperture;

fastening said pin to said mounting bracket; and wherein said hooking end has a stop and said step of pivoting comprises moving the support bracket relative to the mounting bracket until the support bracket engages said stop and thereafter movement of the support bracket flexes the first arm.

4. A method according to claim 3, wherein said step of mounting includes inserting a guide pin extending from said mounting bracket into an aperture in the vehicle and fastening said mounting bracket to the vehicle.

* * * * *